Patented Sept. 9, 1924.

1,507,637

UNITED STATES PATENT OFFICE.

JAMES A. ULLMAN, OF WHITE PLAINS, NEW YORK.

INSECTICIDE.

No Drawing.   Application filed March 25, 1922.   Serial No. 546,805.

*To all whom it may concern:*

Be it known that I, JAMES A. ULLMAN, a resident of White Plains, Westchester County, State of New York, and a citizen of the United States of America, have invented certain new and useful Improvements in Insecticides, of which the following is a specification.

My invention relates to improvements in insecticides, and has for its object to produce an effective and comparatively inexpensive insecticide having the advantages hereinafter described, the invention comprehending also the process of producing the insecticide.

In order to more clearly understand the nature of my invention or discovery, I will first give a general summary of the type of insecticide which is now commonly used, and its disadvantages as compared to my new product.

The best known and most largely used ingredient as an active material in contact insecticides is nicotine, and one of its compounds, nicotine sulphate. Nicotine itself, when used for this purpose, is called free nicotine. These materials are usually marketed as 40% solutions, the other 60% consisting of water.

My discovery consists; firstly, in the use of pyridine instead of nicotine. Nicotine and nicotine sulphate are both worth wholesale in 40% solutions about $1.00 a pound, whereas pyridine in the quality in which I use it can be bought for about 25 cents a pound, while the lethal power of pyridin is four times that of nicotine or its compound, so that in dollars and cents, one dollar's worth of pyridine will be as much as $16.00 worth of nicotine. These figures are quoted mainly to show comparative inexpensiveness of my insecticide. Crude pyridine may be used but I prefer refined pyridine such as is used in denaturing alcohol.

The two forms of nicotine described above, i, e., the free nicotine and the nicotine sulphate, are in general use for two different purposes. Inasmuch as the nicotine itself is volatile and is used in closed places, as for instance greenhouses, where it kills insects by its fumes; whereas, the nicotine sulphate is used in the open, where the volatile free nicotine would be dissipated, and therefore, be comparatively inactive.

Now, pyridine can be used for both purposes, inasmuch as it kills both by contact and by its fumes, and is not so volatile that when used in the open its effect will be lessened. In fact, my experiments, wherein I discovered the much greater efficiency of pyridine, were all made in the open and its comparative strength to nicotine thus determined. The nicotine and nicotine sulphate above described are diluted for use by the consumer, usually from one to two teaspoonfuls are added to each gallon of water to make the so-called spray solution. These solutions are used for horticultural and agricultural purposes, and also for dips and washes for sheep and cattle.

It is well known that contact insecticides are greatly improved by the addition of soap. This addition of soap makes the spray spread better and wet the insect. It is, therefore, recommended by the manufacturers of nicotine preparations that the users make a soap solution and add that to the spray solution. This is, however, frequently omitted, and thereby the value of such spray solutions is greatly discounted. The soft soap used in preparing sprays contains about 50% of water, but I have found that better results are obtained by using a soap jelly which contains less water than ordinary soft soap.

A valuable feature of my invention, therefore, consists in having invented a method or process by which pyridine is so combined with soap as to form a cream or jelly in such proportions that when it is used in the same proportion to water as nicotine is used, it will contain sufficient of pyridine to have the necessary lethal power and yet sufficient soap to make it act perfectly, thereby furnishing a complete insecticide, ready for use by the consumer, instead of merely one ingredient, which one has to combine with another ingredient to obtain satisfactory results.

On account of the relative economy of pyridine, I am able to furnish to the consumer, for an equal price, an equal quantity of my preparation as he could purchase of nicotine to do an equal amount of work when equally diluted, and he will not have to add any soap when he uses my preparation, as he would have to do, if he used nicotine or any of its compounds.

In general, my preparation consists of about the following proportions: In 240 parts, there are about 110 parts of anhydrous soap, 60 parts of pyridine, and 70 parts of water. The latter is necessary in the processes of manufacture and as a binder and carrier for the other ingredients.

This preparation may or may not, in addition to the above, be combined with a deodorant, such as nitro-benzol, which may or may not have in itself an insecticide value. In case such a deodorant is used, it would wholly, or partly, take the place of the water in the formula, and thus not detract from the percentage of the other ingredients.

In preparing my compound, I proceed as follows: I take approximately 100 parts by weight of a vegetable oil, such as cocoanut oil. To this I add a solution of about 25 parts of caustic potash in about 40 parts of water, and boil the oil with the caustic solution until I have formed a soap. In this manner, according to the above quantities of materials used, there will be formed about 110 parts of soap, considered as anhydrous soap, which is then in the form of a jelly by reason of the water still present and the glycerine formed in the reaction. While in this stage, I add and mix with it 60 parts by weight of pyridine diluted with about 25 parts by weight of water. Made in this way, all the component parts thoroughly amalgamate to form a stable product.

The resultant product is a concentrated inexpensive insecticide which can be diluted with water and used as a spray or a dip. By reason of its concentration, there is economy in the packing, it can be put up in collapsible tubes on account of its jelly form and is more convenient and economical than the insecticides now on the market.

What I desire to secure by Letters Patent is:—

1. A composition for insecticidal use in aqueous dilution, comprising pyridine in a medium of soap forming a homogeneous mixture of jelly-like consistency capable of rapid dispersion when admixed with water.

2. An insecticide comprising pyridine and the potassium soap from cocoanut oil.

3. A jelly-like insecticide comprising pyridine and the potassium soap from cocoanut oil and capable of very rapid dispersion in water.

4. An insecticide composed of approximately 110 parts by weight of anhydrous soap, 60 parts of pyridine and 70 parts of water, the compound being in the form of a homogeneous mixture of jelly-like consistency capable of rapid dispersion when admixed with water.

5. An insecticide composed of approximately 110 parts by weight of anhydrous potassium soap from cocoanut oil, 60 parts of pyridine and 70 parts of water.

6. The process of producing an insecticide for use in aqueous dilution which comprises boiling approximately 100 parts by weight of a vegetable oil and 20 parts of caustic potash in about 40 parts of water to produce a soap and mixing the same with about 60 parts by weight of pyridine diluted with 25 parts of water to form a homogeneous mixture having a jelly-like consistency and being capable of very rapid dispersion when admixed with water.

7. The process of producing an insecticide which comprises boiling approximately 100 parts by weight of a cocoanut oil and 20 parts of caustic potash in about 40 parts of water to produce a soap and mixing the same with about 60 parts by weight of pyridine, diluted with 25 parts of water to form a jelly.

JAMES A. ULLMAN.